(12) United States Patent
Pieronczyk et al.

(10) Patent No.: US 7,604,254 B2
(45) Date of Patent: Oct. 20, 2009

(54) DEVICE FOR BLOCKING THE STEERING SHAFT OF A MOTOR VEHICLE

(75) Inventors: Martin Pieronczyk, Dachau (DE); Werner Trischberger, Langenpettenbach (DE)

(73) Assignee: Huf Hülsbeck & Fürst GmbH & Co KG, Velbert (DE)

( * ) Notice: Subject to any disclaimer, the term of this patent is extended or adjusted under 35 U.S.C. 154(b) by 258 days.

(21) Appl. No.: 11/661,319

(22) PCT Filed: Jul. 22, 2005

(86) PCT No.: PCT/EP2005/008021
§ 371 (c)(1), (2), (4) Date: Feb. 27, 2007

(87) PCT Pub. No.: WO2006/027048
PCT Pub. Date: Mar. 16, 2006

(65) Prior Publication Data
US 2007/0256879 A1 Nov. 8, 2007

(30) Foreign Application Priority Data
Jun. 10, 2004 (DE) .......................... 10 2004 043 898

(51) Int. Cl.
*B62D 1/18* (2006.01)
(52) U.S. Cl. .......................... 280/775; 180/277; 70/183; 70/184
(58) Field of Classification Search ................. 280/775; 180/277; 70/182, 183, 184, 185, 186
See application file for complete search history.

(56) References Cited

U.S. PATENT DOCUMENTS

| 5,632,167 | A | * | 5/1997 | Kawachi et al. | 70/186 |
| 5,906,120 | A | * | 5/1999 | Thacker et al. | 70/186 |
| 6,543,262 | B2 | * | 4/2003 | Limburg et al. | 70/186 |
| 6,755,058 | B2 | * | 6/2004 | Zillmann | 70/252 |
| 6,915,671 | B2 | * | 7/2005 | Zillmann | 70/186 |
| 7,007,525 | B2 | * | 3/2006 | Okuno et al. | 70/186 |
| 7,121,126 | B2 | * | 10/2006 | Zillmann | 70/186 |

(Continued)

FOREIGN PATENT DOCUMENTS

DE     100 30 688 C1    10/2001

(Continued)

*Primary Examiner*—Toan C To
(74) *Attorney, Agent, or Firm*—Bacon & Thomas, PLLC

(57) ABSTRACT

A device for blocking the steering shaft of a motor vehicle against rotation by a locking bolt which can be axially moved back and forth between locked and released positions via a two-directionally rotatable control member, and comprises a locking element and an actuating element. The control member surrounds the actuating element and has two helically extending interior grooves and a planar end surface adjoining the grooves and extending perpendicular to the axis of rotation of the control member. A transverse pin axially displaced in the actuating element cooperates with the grooves and the end surface. A helical compression spring is supported on the actuating element via a plunger having an oblong hole through which the transverse pin extends, and which plunger can be axially displaced in the actuating element by a stop so that the helical compression spring presses the transverse pin against the end surface via the locking element and the actuating element in the released position of the locking bolt.

6 Claims, 8 Drawing Sheets

U.S. PATENT DOCUMENTS

| | | | |
|---|---|---|---|
| 7,260,963 B2 * | 8/2007 | Suzuki et al. | 70/186 |
| 7,363,785 B2 * | 4/2008 | Limburg et al. | 70/186 |
| 2001/0025516 A1 | 10/2001 | Starken | |
| 2002/0116962 A1 | 8/2002 | Zillmann | |

FOREIGN PATENT DOCUMENTS

| | | |
|---|---|---|
| EP | 1 110 828 A2 | 6/2001 |
| EP | 1 236 626 A2 | 9/2002 |

* cited by examiner

DEVICE FOR BLOCKING THE STEERING SHAFT OF A MOTOR VEHICLE

BACKGROUND

The invention relates to a device for blocking the steering shaft of a motor vehicle against rotation by means of a locking bolt, which is movable axially back and forth between a locked position and a released position in a housing via a control member that can be rotated back and forth. The locking bolt comprises a locking element and an actuating element, and the control member surrounds the actuating element and has two helically extending interior grooves as well as a plane end surface, adjoining the grooves and perpendicular to the axis of rotation of the control member, with which grooves and end surface a transverse pin that is axially displaceable in a transverse bore of the actuating element cooperates, and the locking element is adapted to be pushed into the actuating element against the action of a helical compression spring.

Such a device is known (German Patent 100 30 688 C1). Therein, the actuating element of the locking bolt and the control member cooperate in such a way that upon rotation of the control member in that direction in which the two ends of the transverse pin, which protrude from the transverse bore of the actuating element, run in the grooves of the control member toward its end surface that is bounded by a side flank extending toward the actuating element from the bottom of one groove outside and past the other groove at a distance from it, the actuating element is correspondingly displaced axially, so that whenever the ends of the transverse pin make a transition from the grooves to the end surface, the actuating element is stopped and remains in the axial position it has reached, until the control member is rotated in the opposite direction and the ends of the transverse pin move in the grooves away from the end surface, so that the actuating element is displaced axially in the opposite direction. The ends of the transverse pin are pressed against the end surface by a disk spring or helical spring, provided between the end of the actuating element remote from the locking element of the locking bolt and the closure cap of an assembly opening of the housing of the device, so that upon rotation of the control member in the aforementioned opposite direction, they readily enter into the grooves.

SUMMARY

The object of the invention is to improve the known device further, and in particular to reduce the number of springs and simplify its assembly.

The invention in particular provides the advantage that the helical compression spring, which presses the locking element and the actuating element of the locking bolt apart, additionally serves to press the transverse pin of the actuating element, in the released position of the locking bolt, against the end surface of the control member to assure the introduction of the transverse pin into the interior grooves of the control member, so that a separate spring for that purpose is not necessary, which is also favorable for the sake of simpler installation of the locking bolt in the associated housing.

BRIEF DESCRIPTION OF THE DRAWINGS

An embodiment of the device of the invention is described as an example below, in conjunction with drawings, wherein.

DETAILED DESCRIPTION OF THE INVENTION

Figure 1:
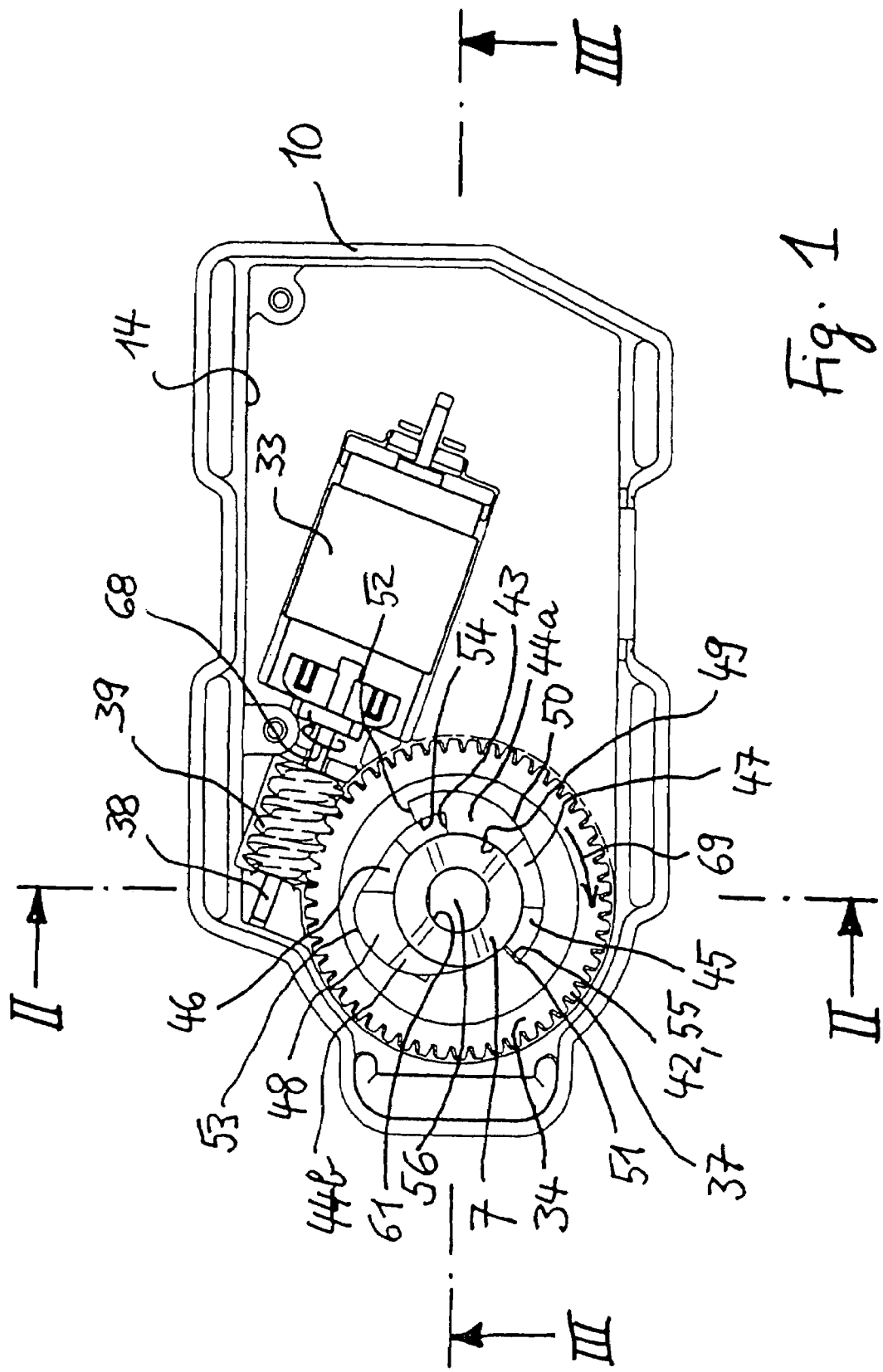
FIG. 1 shows the top view in the direction of the arrow I in FIG. 2, with the closure cap removed from the assembly opening of the housing and with the locking bolt in the locked position.

The device shown for blocking the steering shaft 1 of a motor vehicle against rotation includes a locking bolt 2, which cooperates with a locking sleeve 3 that is secured to the steering shaft 1 and has locking grooves 4. The steering shaft 1 and the locking sleeve 3 are surrounded by a jacket tube 5.

The locking bolt 2 comprises a locking element 6 and an actuating element 7, which are disposed coaxially to one another and can be telescoped in one another against the action of a helical compression spring 8.

The locking element 6 has a rectangular cross section and is supported axially displaceably in a conduit 9 of corresponding cross section in a housing 10, the longitudinal axis 11 of which intersects the common longitudinal axis 12 of the steering shaft 1 and the jacket tube 5 coaxial with it at a right angle. The housing 10, on the side remote from the steering shaft 1 and the jacket tube 5, is provided with an assembly opening 14, which is closed with a cap 13, and is secured in a receptacle 15 provided on the jacket tube 5.

The actuating element 7 is formed as a cylindrical bolt and is axially displaceably supported in a cylindrical bore 16 of the housing 10, which bore extends coaxially to the conduit 9 that receives the locking element 6. Opposite the two narrow side faces 17, 18 of the locking element 6, two longitudinal grooves 19, 20 formed in the housing 10 open into the bore 16. Two outer radial protrusions 21, 22 of the actuating element 7 project into the two longitudinal grooves 19, 20.

The end 23, remote from the steering shaft 1, of the locking element 6 is located in a blind bore 24 provided in the actuating element 7 and having a cross section corresponding to the rectangular cross section of the locking element 6 and is provided with a splined pin 25, which extends perpendicular to the two wide side faces 26, 27 of the locking element 6 and the two ends 28, 29 of which, protruding out of the locking element 6, engage two lateral oblong holes 30, 31 of the actuating element 7. The helical compression spring 8 is disposed in the blind bore 24 of the actuating element 7. It rests with one end on the end 23 of the locking element 6 and with the other end on the actuating element 7 and presses the two protruding ends 28, 29 of the splined pin 25 of the locking element 6 against the ends, near the steering shaft 1, of the two oblong holes 30, 31 of the actuating element 7.

Figure 2:
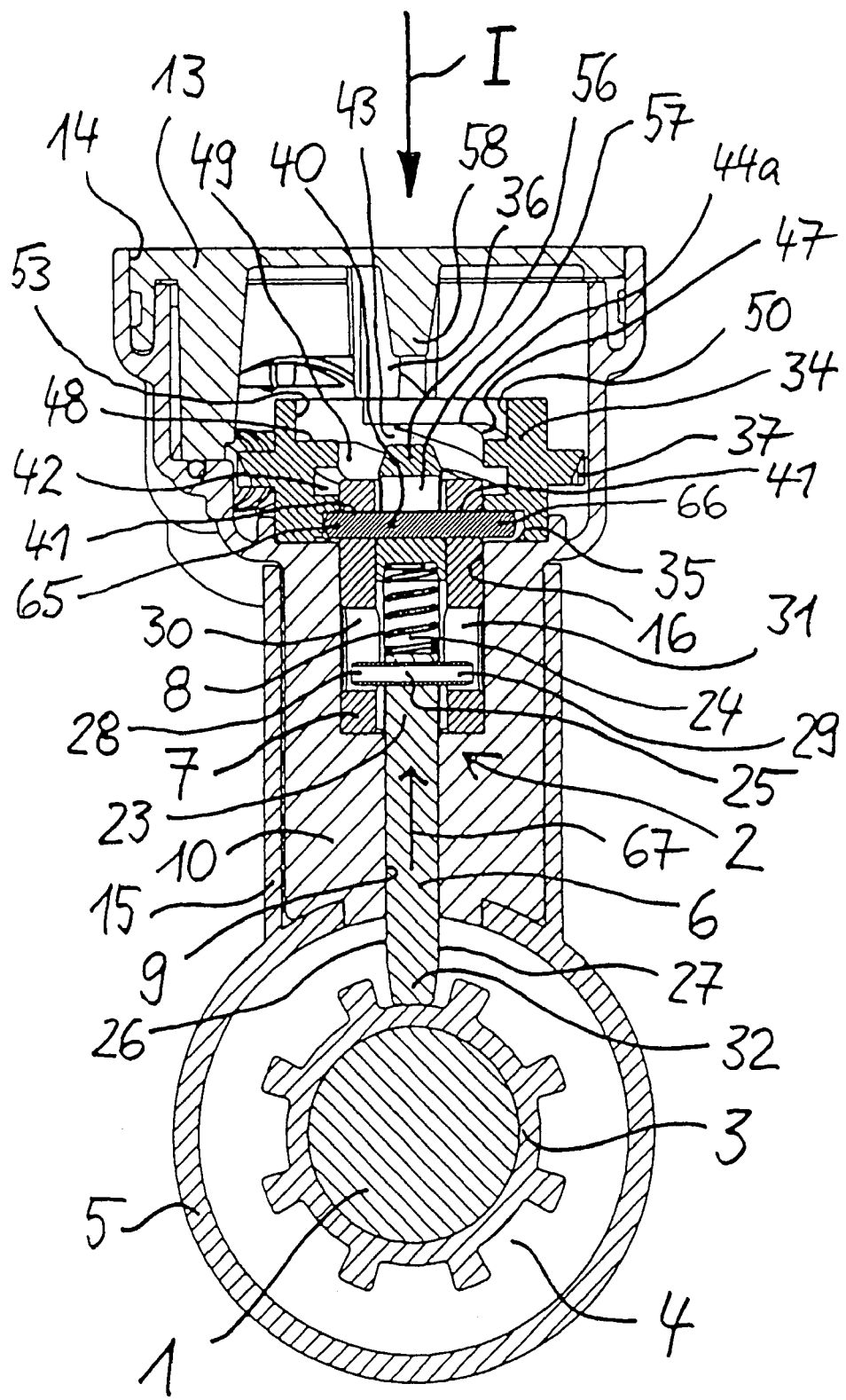
FIG. 2 is a longitudinal section taken along the line II-II in FIG. 1, also showing the associated motor vehicle steering shaft and its jacket tube.
Figure 3:
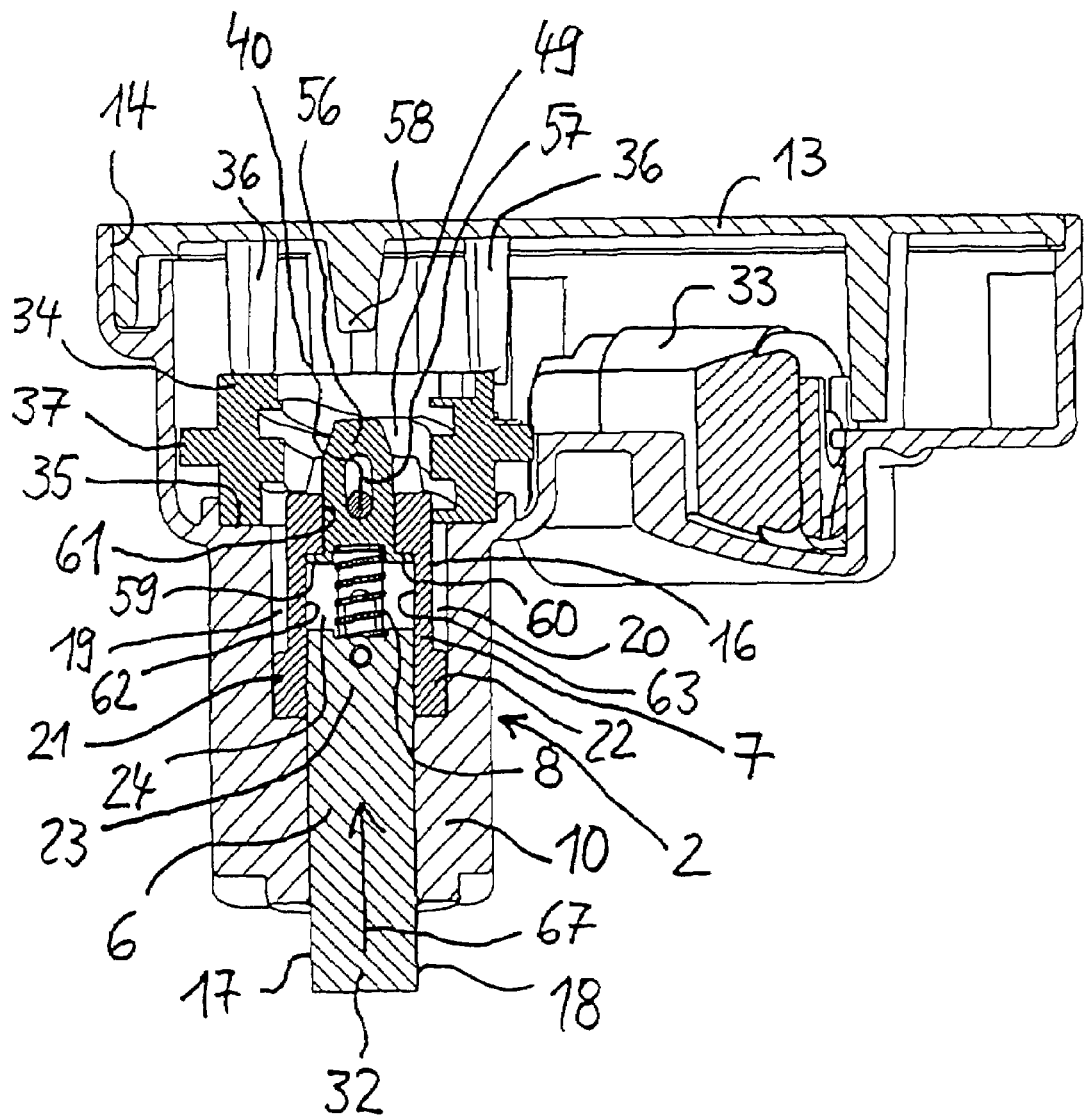
FIG. 3 is a longitudinal section taken along the line III-III in FIG. 1.
Figure 5:
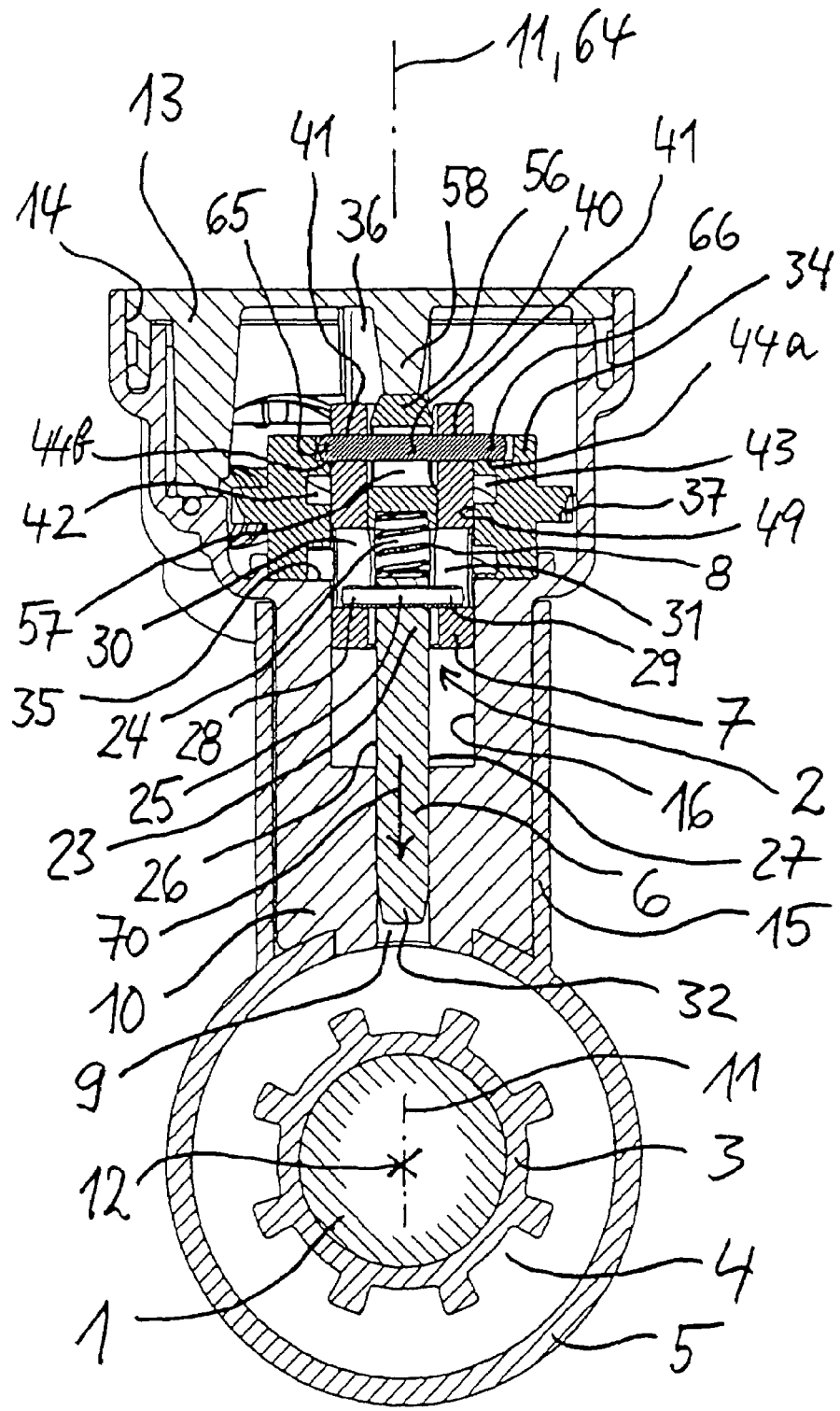
FIG. 5 is a longitudinal section taken along the line V-V in FIG. 4, also showing the associated motor vehicle steering shaft and its jacket tube.
Figure 6:
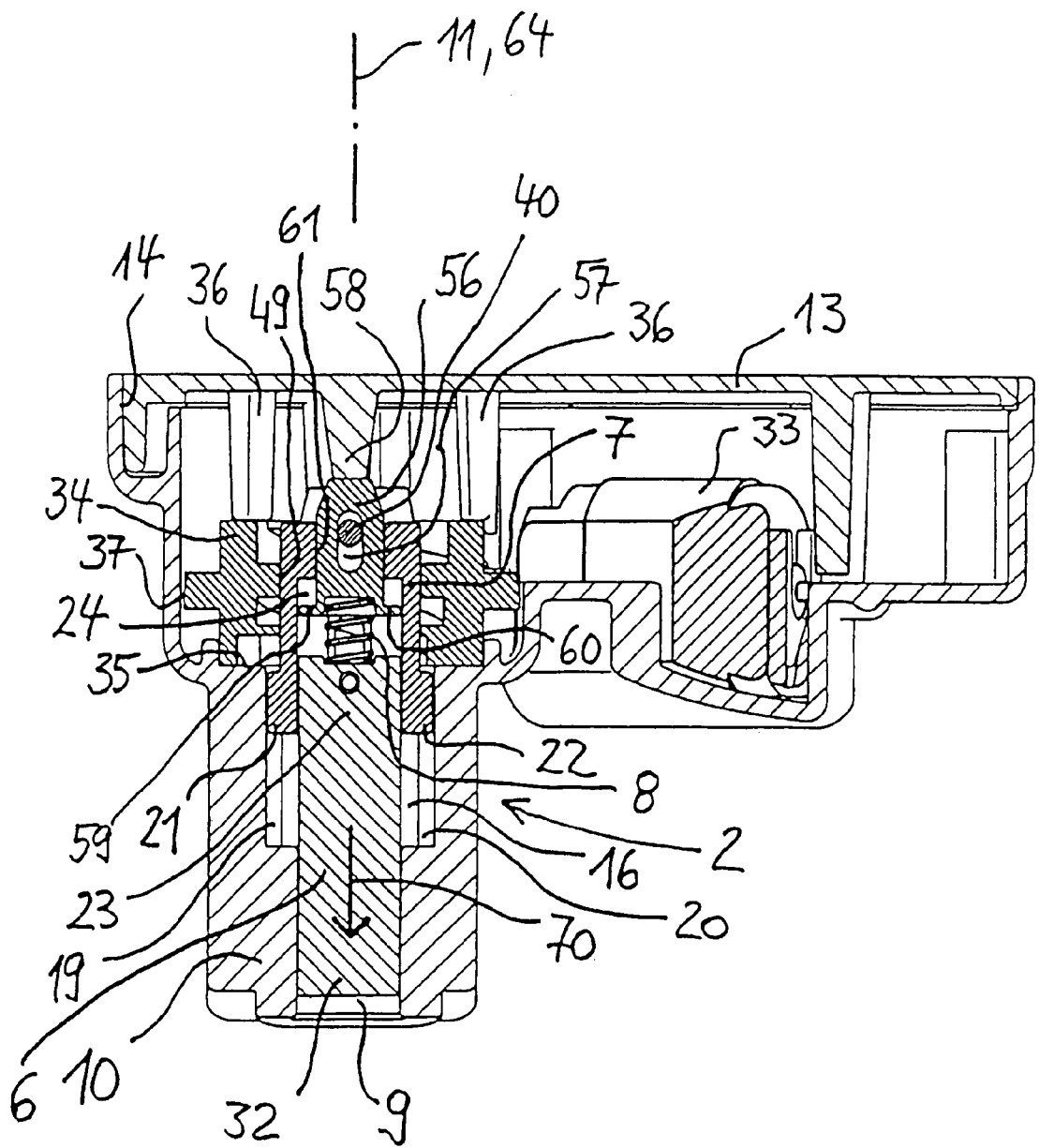
FIG. 6 is a longitudinal section taken along the line VI-VI in FIG. 4.

The locking bolt 2 is movable back and forth in the housing 10 between the locked position, visible in FIGS. 2 and 3, in which, with the end 32, near the steering shaft 1, of the locking element 6, the bolt engages a locking groove 4 of the locking sleeve 3, so that the steering shaft 1 can no longer be rotated, and the released position visible in FIGS. 5 and 6, in which the locking bolt 2, with the end 32 of the locking element 6, does not engage any locking groove 4 of the locking sleeve 3 and releases the steering shaft 1, so that the steering shaft can be rotated. The locking element 6 can move into the blind bore 24 of the actuating element 7, against the action of the helical compression spring 8, if during the motion of the locking bolt 2 to the locked position, no locking groove 4 of the locking sleeve 3 happens to be aligned with the locking element 6, in order to receive the free end 32 thereof.

For axial displacement of the locking bolt 2 into the released position and in the opposite direction into the locked position, or for axial displacement of the actuating element 7 into the position shown in FIGS. 5 and 6 driving the locking element 6 into the released position and in the opposite direction into the position shown in FIGS. 2 and 3 driving the locking element 6 into the locked position, a control member 34 is used, which is rotatable back and forth by means of an electric motor 33 the direction of rotation of which can be reversed. The control member 34 is disposed coaxially with the actuating element 7 and surrounds the actuating element 7, is supported in the housing 10 rotatably about the common longitudinal axis 11 of the locking element conduit 9 and the actuating element bore 16 between an annular surface 35 of the housing 10 that is coaxial with the longitudinal axis 11 and a ring, coaxial with the longitudinal axis 11, of internal protrusions 36 on the closure cap 13 of the assembly opening 14 of the housing 10 and is formed as a worm gear having external teeth 37 which are engaged by a drive worm 39 secured on the output shaft 38 of the electric motor 33.

The outer control member 34 cooperates with a cylindrical transverse pin 40 of the inner actuating element 7, which pin is supported axially displaceably in a cylindrical transverse bore 41 of the actuating element 7. To that end, the control member 34 is provided with two helically extending interior grooves 42, 43 and with a plane end surface which is oriented perpendicular to the axis of rotation 11 of the control member 34 and which comprises two portions 44a and 44b which adjoin the one groove 42 and the other groove 43, respectively, which is connected via an intermediate surface 45 or respectively 46 and an oblique surface 47 or respectively 48 with the end surface portion 44a or respectively 44b. The two intermediate surfaces 45 and 46 are located in the same plane, which is perpendicular to the axis of rotation 11 of the control member 34, and the two oblique surfaces 47 and 48 each have the same inclination as each of the two grooves 42 and 43 that extend along the cylindrical bore 49 of the control member 34, which bore serves to receive the actuating element 7.

The intermediate surface 45, the adjoining oblique surface 47, and the following end surface portion 44a of the one groove 42 of the control member 34 are bounded by a first perpendicular side flank 50, which extends from the bottom 51 of this groove 42 to the end 52, remote from the oblique surface 47, of the end surface portion 44a, on the outside of and past the other groove 43 of the control member 34 at a certain distance. The intermediate surface 46, the adjoining oblique surface 48, and the following end surface portion 44b of the other groove 43 of the control member 34 are bounded by a second perpendicular side flank 53, which extends outward from the bottom 54 of this groove 43 and then inward toward the bore 49 of the control member 34, which bore serves to receive the actuating element 7, so that at the orifice 55, where the groove 42 opens to the intermediate surface 45, it meets the bore 49.

The helical compression spring 8, against the force of which the locking element 6 of the locking bolt 2 is axially displaceable into the actuating element 7 of the locking bolt, rests on the actuating element 7 via a plunger 56. The plunger 56 has an oblong hole 57, through which the transverse pin 40 of the actuating element 7 extends, and the plunger is axially displaceable in the actuating element 7 by means of a stop 58 fixed to the housing, so that the helical compression spring 8, in the released position of the locking bolt 2, presses the transverse pin 40 of the actuating element 7 against the end surface (end surface portions 44a and 44b) of the control member 34.

For transmitting the force of the helical compression spring 8 to the actuating element 7, the plunger 56 is provided with two lateral protrusions 59 and 60, which contact the actuating element 7. As long as the plunger 56 is not in contact with the stop 58 fixed to the housing, the plunger 56 rests with the protrusions 59 and 60 on the actuating element 7, without touching the transverse pin 40 thereof, so that the transverse pin has no load applied by the helical compression spring 8 and can correspondingly easily be displaced axially in both the transverse bore 41 of the actuating element 7 and the oblong hole 57 of the plunger 56.

The plunger 56 is formed cylindrically and is supported axially displaceably in a cylindrical bore 61 of the actuating element 7, which bore opens into the blind bore 24 that is provided in the actuating element 7 for receiving the locking element 6. The two protrusions 59 and 60 of the plunger 56 protrude from the plunger, on sides diametrically opposite one another, radially toward the two narrow side faces 62 and 63 of the blind bore 24, and together with the plunger 56 they have a rectangular outline which corresponds to the rectangular cross section of the blind bore 24. As a result, the protrusions 59 and 60 make the installation of the transverse pin 40 of the actuating element 7 easier, because they thus assure that the oblong hole 57 of the plunger 56 is aligned with the transverse bore 41 of the actuating element 7, so that the transverse pin 40 can be inserted readily through the oblong hole 57 into the transverse bore 41.

The plunger 56 consists of such a material that allows no noise or only little noise to be created when the plunger 56 strikes the stop 58 fixed to the housing. Preferably, the plunger 56 is produced from a plastic suitable for that purpose. However, it is also possible to use such a material for the stop 58 fixed to the housing or for both the plunger 56 and the stop 58 fixed to the housing.

The stop 58 fixed to the housing is located opposite the plunger 56 of the actuating element 7 of the locking bolt 2 and is disposed on the inside of the closure cap 13 of the assembly opening 14 of the housing 10. The common longitudinal axis 64 of the stop 58 and the plunger 56 coincides with the common longitudinal axis 11 of the locking element conduit 9 and the actuating element bore 16, about which the control member 34 rotates.

The device described functions as follows:

When the locking element 6 is in the locked position, then the actuating element 7, with its end surface surrounding the locking element 6, rests on the bottom of the bore 16 in the housing 10, in which bore the actuating element 7 is disposed, the transverse pin 40 of the actuating element 7, i.e. the two ends 65 and 66 of the transverse pin 40 which protrude out of the transverse bore 41 of the actuating element 7, extending beside the annular surface 35 of the housing 10 on which the control member 34 rests. The helical compression spring 8 on the one hand presses the free end 32 of the locking element 6 into a locking groove 4 of the locking sleeve 3 of the steering shaft 1, so that the two ends 28, 29, protruding from the locking element 6, of the splined pin 25 do not touch the ends, adjacent to the steering shaft 1, of the oblong holes 30, 31 of the actuating element 7, and on the other hand, via the plunger 56 and the actuating element 7, presses the transverse pin 40 thereof against the control member 34.

In order to displace the locking element 6 out of the locked position and the actuating element 7 out of the axial position explained in the direction of the arrow 67 in FIGS. 2 and 3 axially into the released position or respectively into the corresponding axial position of FIGS. 5 and 6, the electric motor 33 is switched on, so that it rotates the drive worm 39 in the direction of the arrow 68 and rotates the control member 34 in the direction of the arrow 69 in FIG. 1. As a consequence, the two ends 65 and 66, protruding from the transverse bore 41, of the transverse pin 40 of the actuating element 7 enter the two helically extending grooves 42 and 43 of the control member 34 and then run within the grooves 42 and 43 toward the intermediate surfaces 45 and 46 thereof and then slide along the intermediate surfaces 45 and 46 and the adjoining oblique surfaces 47 and 48 to the end surface portions 44*a* and 44*b* of the grooves 42 and 43. As soon as the plunger 56 comes into contact with the stop 58 fixed to the housing in this process, it is pushed into the bore 61 of the actuating element 7 in order to compress the helical compression spring 8. In the particular rotary position of the control member 34 in which the ends 65 and 66 of the transverse pin 40 pass onto the end surface portions 44*a* and 44*b*, the actuating element 7 has reached the axial position in which the locking element 6 assumes the released position. Then the helical compression spring 8, supported via the plunger 56 on the stop 58 fixed to the housing, presses, via the locking element 6, its splined pin 25, and the actuating element 7, the transverse pin 40 of the actuating element against the end surface portions 44*a* and 44*b* of the control member 34, as is shown especially clearly in FIG. 5.

Figure 4:
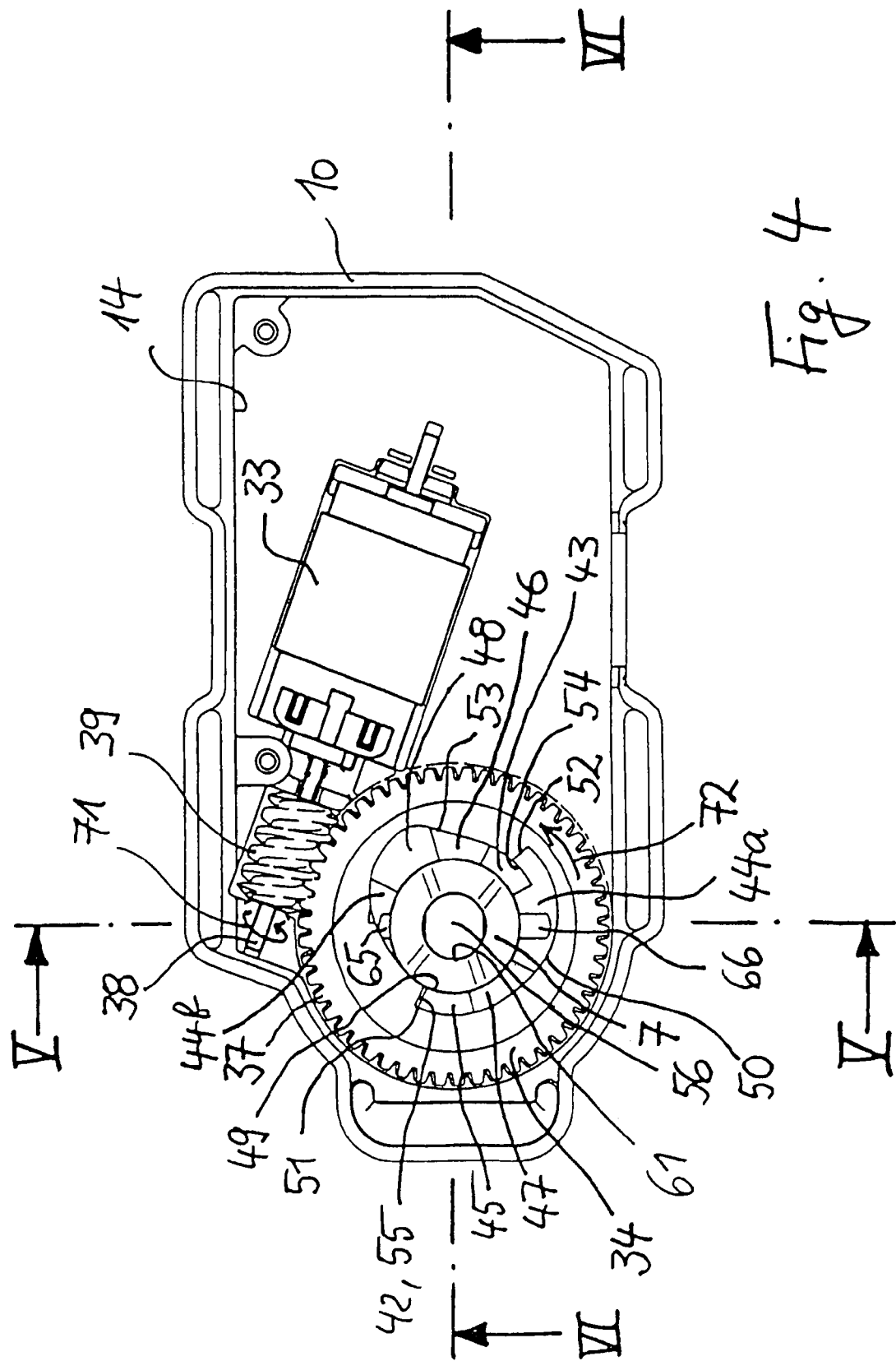
FIG. 4 is a top view as in FIG. 1, with the locking bolt in the released position.

In order to displace the locking element 6 out of the released position and the actuating element 7 out of the aforementioned axial position in the direction of the arrow 70 in FIGS. 5 and 6 axially into the locked position or respectively into the corresponding axial position shown in FIGS. 2 and 3, the electric motor 33 is switched on, so that it rotates the drive worm 39 in the direction of the arrow 71 and rotates the control member 34 in the direction of the arrow 72 in FIG. 4. As a consequence, the two ends 65 and 66 of the transverse pin 40 of the actuating element 7, which protrude from the transverse bore 41 of the actuating element 7, are introduced, under the influence of the helical compression spring 8, from the two end surface portions 44*a* and 44*b* via the two oblique surfaces 47 and 48 and the two intermediate surfaces 45 and 46 into the two helically extending grooves 42 and 43 of the control member 34, so as to run, within the grooves 42 and 43, toward the annular surface 35 of the housing 10.

Figure 7:
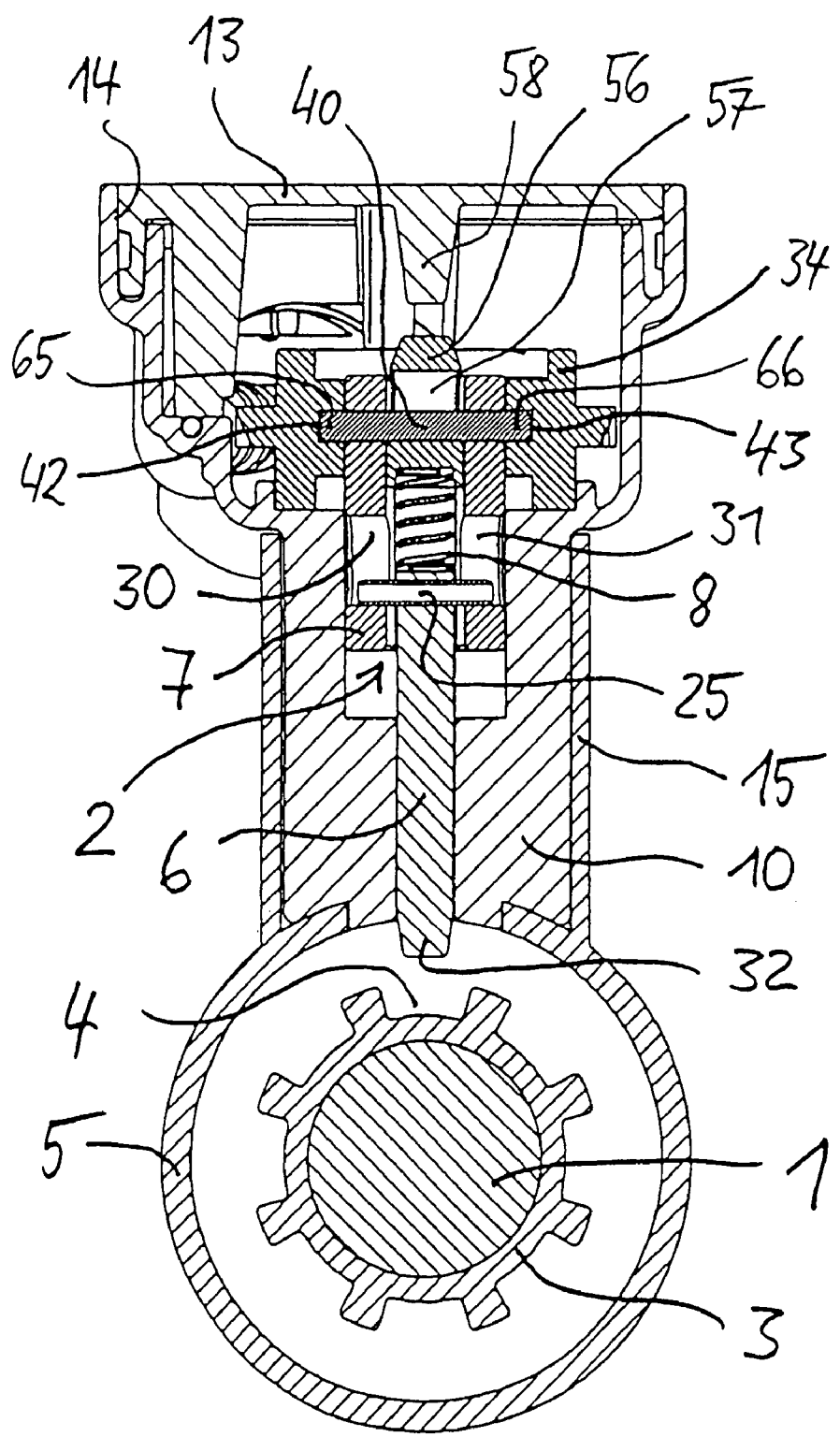
FIG. 7 is a longitudinal section as in FIGS. 2 and 5, in which the locking bolt assumes an intermediate position.
Figure 8:
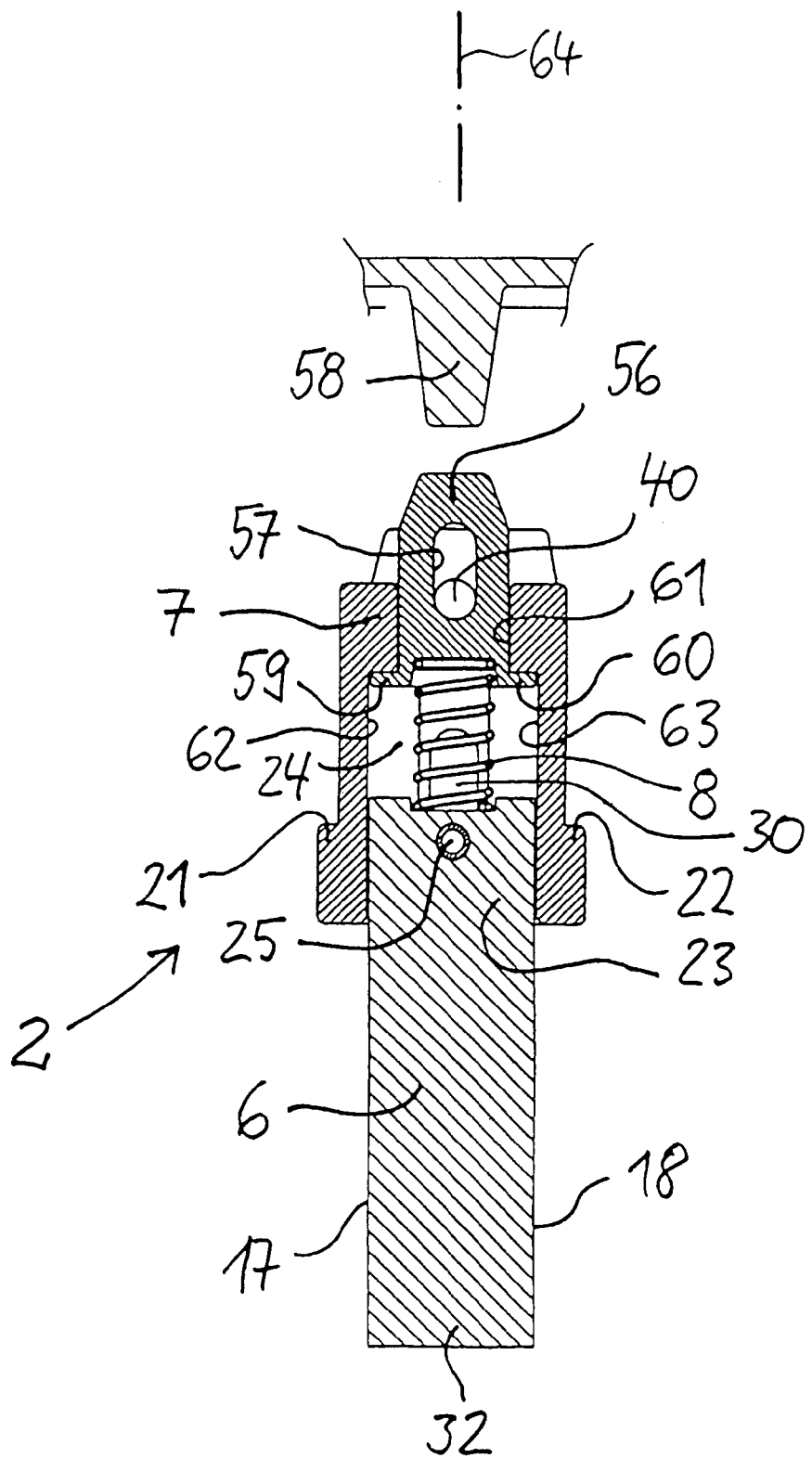
FIG. 8 is a longitudinal section as in FIGS. 3 and 6 on a larger scale and without the housing and without the control member, with the locking bolt assuming the intermediate position as in FIG. 7.

FIGS. 7 and 8 show the status of the locking bolt 2 in an intermediate position, which is between the locked position in FIGS. 2 and 3 and the released position in FIGS. 5 and 6, and in which position the two outwardly protruding ends 65 and 66 of the transverse pin 40 of the actuating element 7 are received in the two helically extending interior grooves 42 and 43 of the control member 34.

The invention claimed is:

1. Device for blocking the steering shaft (1) of a motor vehicle against rotation by means of a locking bolt (2), which is movable axially back and forth between a locked position and a released position in a housing (10) via a control member (34) that is rotatable back and forth, said locking bolt comprising a locking element (6) and an actuating element (7), wherein the control member (34) surrounds the actuating element (7) and has two helically extending interior grooves (42, 43) as well as a plane end surface (44*a*, 44*b*), adjoining the grooves and extending perpendicular to the axis of rotation (11) of the control member (34), a transverse pin (40) that is axially displaceable in a transverse bore (41) of the actuating element (7) cooperates with the grooves (42, 43) and the end surface (44*a*, 44*b*), and wherein the locking element (6) is adapted to be pushed into the actuating element (7) against the action of a helical compression spring (8), and wherein the helical compression spring (8) is supported on the actuating element (7) via a plunger (56), said plunger having an oblong hole (57) through which the transverse pin (40) of the actuating element (7) extends, and said plunger being axially displaceable in the actuating element (7) by means of a stop (58) fixed to the housing, so that the helical compression spring (8), in the released position of the locking bolt (2), presses the transverse pin of the actuating element, via the locking element (6) and the actuating element (7), against the end surface (44*a*, 44*b*) of the control member (34).

2. Device according to claim 1, wherein the plunger (56), for transmitting the force of the helical compression spring (8) to the actuating element (7), is provided with two lateral protrusions (59, 60), which contact the actuating element (7).

3. Device according to claim 2, wherein the plunger (56) is formed cylindrically and is axially displaceably supported in a cylindrical bore (61) of the actuating element (7), which bore opens into a blind bore (24) of rectangular cross section, provided in the actuating element (7), for receiving both the locking element (6), which is provided with a corresponding rectangular cross section, and the two protrusions (59, 60), protruding radially from the plunger (56), which together with the plunger (56) have a corresponding rectangular outline.

4. Device according to claim 1, wherein the plunger (56) or the stop (58) fixed to the housing comprises, or both the plunger (56) and the stop (58) fixed to the housing, comprises a noise suppressing material such that no noise whatever, or only little noise, develops when the plunger (56) strikes the stop (58).

5. Device according to claim 4, wherein the plunger (56) or the stop (58) fixed to the housing, or both the plunger (56) and the stop (58) fixed to the housing, comprise a plastic.

6. Device according to claim 1, wherein the stop (58) fixed to the housing is provided on the closure cap (13) of an assembly opening (14) of the housing (10).

* * * * *